United States Patent
Schreiber

(10) Patent No.: US 12,000,460 B2
(45) Date of Patent: Jun. 4, 2024

(54) GEAR MECHANISM

(71) Applicant: WITTENSTEIN SE, Igersheim (DE)

(72) Inventor: Heiko Schreiber, Doberschau (DE)

(73) Assignee: WITTENSTEIN SE, Igersheim (DE)

(*) Notice: Subject to any disclaimer, the term of this patent is extended or adjusted under 35 U.S.C. 154(b) by 0 days.

(21) Appl. No.: 17/735,237

(22) Filed: May 3, 2022

(65) Prior Publication Data
US 2022/0349457 A1 Nov. 3, 2022

(30) Foreign Application Priority Data
May 3, 2021 (DE) .......................... 102021111364.4

(51) Int. Cl.
*F16H 25/14* (2006.01)

(52) U.S. Cl.
CPC ................................. *F16H 25/14* (2013.01)

(58) Field of Classification Search
CPC ........... F16H 25/14; F16H 55/17; F16H 49/00
USPC ............................................................. 74/55
See application file for complete search history.

(56) References Cited

U.S. PATENT DOCUMENTS

| 10,626,973 | B2* | 4/2020 | Burger | H02P 27/04 |
| 2009/0205451 | A1* | 8/2009 | Bayer | F16H 25/06 |
| | | | | 74/439 |
| 2013/0255421 | A1* | 10/2013 | Schmidt | F16H 25/2009 |
| | | | | 29/893.1 |
| 2016/0298747 | A1* | 10/2016 | Schreiber | F16H 49/001 |
| 2016/0298748 | A1 | 10/2016 | Schreiber et al. | |
| 2016/0298750 | A1* | 10/2016 | Schreiber | F16H 49/001 |
| 2018/0209530 | A1* | 7/2018 | Schreiber | F16H 49/001 |

FOREIGN PATENT DOCUMENTS

| DE | 102006042786 A1 | 3/2008 |
| DE | 102007016189 A1 | 10/2008 |
| DE | 102015105520 A1 | 10/2016 |
| DE | 102015105523 A1 | 10/2016 |

OTHER PUBLICATIONS

Office action dated Oct. 30, 2023 for corresponding European Application No. 22 170 003.2.

* cited by examiner

*Primary Examiner* — T. Scott Fix
(74) *Attorney, Agent, or Firm* — Bachman & LaPointe, P.C.

(57) ABSTRACT

Gear mechanism (1) having a toothing (5), a tooth carrier (11) accommodating a plurality of teeth (7) for engagement with the toothing, the teeth (7) being radially displaceable relative to the tooth carrier (11), a drive input with a profiling (22) for radially driving the teeth (7), and bearing segments (24) for mounting the teeth on the profiling. Each bearing segment includes a running side oriented in the direction of the profiling and a bearing side opposite the running side, a tooth bearing arranged on the bearing side for articulated mounting of at least one of the teeth, the tooth bearing including a bead which is at least substantially in the shape of a cylinder section and arranged from a first side edge to a second side edge of the bearing segment transverse to a running direction of the bearing segment. The bead is in a central region between the first and second side edges and has a first and/or second recess on a first and/or second side of the central region.

13 Claims, 4 Drawing Sheets

GEAR MECHANISM

BACKGROUND OF THE INVENTION

The invention relates to a gear mechanism, and to the use of a gear mechanism.

From the prior art, gear mechanisms are known which comprise teeth which are mounted in radially displaceable fashion in a tooth carrier. Drive input elements with a profiling, such as for example cam disks, are used for driving the teeth. The teeth engage in a toothing such that a relative movement between the tooth carrier with the teeth and the toothing occurs. The relative movement between toothing and teeth is in this case smaller, by at least an order of magnitude, than the movement of the drive input element with the profiling. In this way, it is possible to realize high transmission ratios.

A critical point of said gear mechanisms is the axial mounting of the bearing segments. It is known to insert thrust washers to the side of the bearing segments; an example of such a gear mechanism is shown in DE 10 2015 105 520 A1. However, undesirable wear may occur.

SUMMARY OF THE INVENTION

It is an object of the invention to specify gear mechanisms which are improved in relation to gear mechanisms known from the prior art, wherein it is sought to achieve reduced wear or simple installation.

The object is achieved by way of a gear mechanism as disclosed herein and the use of a gear mechanism also as disclosed herein. Advantageous refinements and embodiments will emerge from the dependent claims and from this description.

One aspect of the invention relates to a gear mechanism, in particular coaxial gear mechanism or linear gear mechanism, having a toothing, a tooth carrier in which a plurality of teeth for engagement with the toothing are accommodated, wherein the teeth are radially displaceably mounted relative to the tooth carrier, a drive input element with a profiling for radially driving the radially displaceably mounted teeth, and bearing segments for mounting the teeth on the profiling, wherein each of the bearing segments comprises: a running side oriented in the direction of the profiling and a bearing side opposite the running side, a tooth bearing, which is arranged on the bearing side, for the articulated mounting of at least one of the teeth, wherein the tooth bearing comprises a bead which is at least substantially in the shape of a cylinder section and which is arranged from a first side edge to a second side edge of the bearing segment in a direction transversely with respect to a running direction of the bearing segment, and wherein the bead is arranged in a central region between the first side edge and the second side edge and has a first recess on a first side of the central region or has a second recess on a second side of the central region.

The tooth bearing is typically oriented in an articulated manner about an axis transversely with respect to the running direction of the bearing segment. The bearing segment has in particular a running direction in the revolving direction of the gear mechanism. In typical embodiments, the bead is arranged at least substantially centrally between front and rear edge of the bearing segment. Typical beads of embodiments do not reach over the complete length from one side edge to another side edge of the bearing segments. In further embodiments, the bead reaches as far as the two side edges. Recesses are typically provided on both sides of a central region of the bead. In typical embodiments, there can be at least one recess, or there can be, for example, two recesses, in the central region of the bead.

A further aspect of the invention relates to the use of a gear mechanism in one of the typical embodiments.

In typical embodiments, a holding ring is pressed onto the tooth in the region of the tooth base or tooth root of the tooth, wherein the holding ring is fastened to the tooth by itself or at least partially by the press fit. The tooth is typically at least substantially configured as a round tooth at least in a region of a tooth body. In typical embodiments, the tooth has a recess on the tooth base for engagement with the bead of the bearing segment, wherein the bead permits pivoting of the tooth relative to the bearing segment, wherein the tooth, however, holds the bearing segment in its position in the circumferential direction in relation to the tooth. In embodiments, the bearing segment may also be referred to as pivot segment.

The term in the shape of a cylinder section is typically considered to be an angular section of a lateral surface of a circular cylinder. In exemplary embodiments, the angular section comprises a minimum of 50° or a maximum of 200°.

In the bearing segment, recesses are introduced, in particular into the bead, wherein the holding ring engages in the recesses. Should forces act on the bearing segment in the axial direction, for example from a rolling bearing arrangement of the bearing segment, the bearing segment is supported on the holding ring in the axial direction. The holding ring is in turn supported in the axial direction by the tooth. The tooth is immovable in the axial direction in the tooth carrier and transmits the supporting forces into the tooth carrier. In embodiments, the cross section of the holding ring can be increased by a step being provided on the tooth base of the tooth.

Unless stated otherwise, direction details refer to the gear mechanism, i.e., for example, the axial direction is oriented in the direction of the axis of rotation of the gear mechanism.

The tooth typically comprises a tooth tip, which is provided for engagement with the toothing, an intermediate part of the tooth, which extends between tooth tip and tooth base, and a tooth base, which may also be referred to as tooth root, which is provided for supporting on the tooth bearing of the bearing segment. Tooth base and tooth tip are typically located at different ends of the tooth. The tooth base can typically lie against the tooth bearing of the bearing segment.

Embodiments of the invention relate in particular to coaxial gear mechanisms. Gear mechanisms of the invention conventionally comprise an internally situated cam disk with a profiling as drive input element, and an internal gear with an internally situated toothing or an externally situated drive input element with an internal profiling and an internally situated gear wheel or an internally situated tooth rack which, in the case of the externally situated drive input element, constitutes the toothing. Configurations of embodiments relate to linear gear mechanisms for the conversion of a rotation into a linear movement.

The toothing is typically an encircling toothing. The teeth or the tooth tips of the teeth engage in the toothing, wherein the teeth are typically mounted so as to be linearly radially displaceable relative to the tooth carrier. Here, "linearly radially" means, in the conventional sense, that a guide in a radial direction is provided, which guide permits only a movement of the tooth in the radial direction. Typically, by way of the guide, the tooth segment can be displaced linearly in precisely one direction; this may be achieved for example by virtue of the fact that the tooth has a uniform cross section over a particular length in the displacement direction, wherein the tooth carrier likewise has an opening for the tooth segment with a uniform cross section. The teeth are normally mounted in the tooth carrier so as to be displaceable in each case in precisely one direction, typically in the direction of the longitudinal axis of the tooth. Furthermore, in typical embodiments, the rotational degree of freedom of the teeth relative to the tooth carrier about the longitudinal axis of the gear mechanism is blocked. This may be achieved for example by way of a linear guide of the teeth in a radial direction in the tooth carrier. In this way, the teeth rotate with the tooth carrier about the longitudinal axis of the gear mechanism, but not relative to the tooth carrier.

In typical embodiments of the gear mechanisms according to the invention, at least a part of the teeth is of flexurally rigid design. Here, the expression "flexurally rigid" is typically to be understood in the technical sense, that is to say bending of the teeth is, owing to the rigidity of the material of the teeth, so slight as to be at least substantially insignificant with regard to the kinematics of the gear mechanism. Flexurally rigid teeth comprise, in particular, teeth which are produced from a metal alloy, in particular steel or a titanium alloy, a nickel alloy or other alloys. Furthermore, it is also possible for flexurally rigid teeth composed of plastic to be provided, in particular in the case of gear mechanisms in which at least one of the following parts is likewise also produced from plastic: toothing on an internal gear or on a gear wheel, tooth carrier and drive input element. In typical embodiments of the invention, the tooth carrier and the teeth are produced from a metal alloy, or additionally the toothing, or further additionally the drive input element, are produced from a metal alloy. Such gear mechanisms have the advantage of being extremely resistant to torsion and having a high load capacity. Gear mechanisms composed of plastic have the advantage of having a low weight. The expression "flexurally rigid" refers in particular to flexural rigidity about a transverse axis of the tooth segment. This means in particular that, considering the tooth segment as a beam from a tooth root to a tooth tip, flexural rigidity exists which at least substantially prevents bending deformations between tooth tip and tooth root. Owing to the flexural rigidity, an extremely high load capacity and resistance to torsion of the gear mechanism is achieved.

The bearing segments preferably have edges, facing toward one another, with elevations and depressions, for example an undulating form or a serrated form. This offers the advantage that needle rollers which are arranged under the bearing segments are reliably held in the space between the bearing segments and the drive input element even in the case of a relatively large spacing between the bearing segments. In embodiments, the bearing segments can be mounted directly on the profiling of the cam disk.

Typical embodiments of the invention comprise a drive input element with a profiling. The profiling preferably has a non-circular or a non-ellipsoid arcuate shape or curve. In the context of this application, eccentrics likewise fall under the definition of circular or ellipsoid shapes, because in the case of eccentrics, it is merely the case that the axis of rotation does not correspond to the central axis of the circular shape, despite a circular shape nevertheless being present. In typical embodiments, the tooth carrier or the toothing is of circular form. This offers the advantage of a simple geometry for the tooth carrier and for the toothing. It is typically the case that the transmission of force on the slow side of the gear mechanism takes place between the toothing and the tooth carrier. This offers the advantage that the distance for the transmission of force is extremely short, such that extremely high rigidity can be achieved. Embodiments which satisfy said conditions include, but are not limited to: a gear mechanism with internally situated cam disk as drive input and externally situated internal gear with toothing, wherein the tooth carrier is arranged between internal gear and cam disk; an externally situated cam disk with internally situated profiling on an internal gear for the drive of the radially movable teeth inward against a toothing, which is arranged on a toothed wheel or a toothed rack.

Typically, in embodiments, the bearing segments are movable relative to one another in the circumferential direction. In order to achieve this movability, the bearing segments can have, for example, a spacing between them that is defined by the radial position of the teeth.

In typical embodiments, the beads are designed in such a manner that the axis of rotation of the tooth on the bead coincides at least substantially with the running side. Here, "substantially" means, for example, that the axis of rotation lies above or below the running side at a maximum of 50% or a maximum of 30% or a maximum of 20%, or a maximum of 10% of the diameter of a rolling body. In further embodiments, the axis of rotation lies away from the running side at a maximum of 20%, 10% or 5% of the maximum extent of the bearing segment in a radial direction.

Typically, towards the recesses, beads of embodiments in each case have lateral flanks which run in the circumferential direction rectilinearly at least in sections or run circularly at least in sections. The flank can also be understood as a boundary surface between bead and recess or as a lateral delimitation of the bead. The shape of the flank is typically matched to a shape of a holding ring.

In typical embodiments, one holding ring is provided per tooth, said holding ring at least partially surrounding a tooth base of the respective tooth. In further embodiments, one holding ring is provided for at least two teeth, said holding ring at least partially surrounding the tooth base of the respective teeth. In this way, the bearing segment can be supported in an axial direction with the holding ring via the tooth or the teeth. In typical embodiment variants, the holding ring is composed of steel, but it can also be produced from a comparatively lighter plastic or as a sheet metal bent part. A holding ring composed of steel has a high load-bearing capability and can be produced cost-effectively.

Typically, a shoulder for receiving the holding ring is provided on the tooth base on an outer circumference of the tooth or of the teeth. The space required can be reduced by the shoulder. Typically, the shoulder forms a step inwards, and therefore the tooth at the tooth base has a reduced diameter.

Typical teeth of embodiments have a circular cross section. By means of the holding ring in conjunction with the bead and the internal toothing, complicated additional guiding or supporting elements can be at least substantially dispensed with in embodiments.

The holding ring is typically annular. The ring shape can be flattened or circular. Further holding rings of embodiments are angular, for example are configured in the form of a square or have a plurality of annular sections.

Typically, an outer circumference of the holding ring is rectilinear in sections. For example, a holding ring formed as a circular ring with flattened portions on the inner circumference or on the outer circumference can be provided. With flattened portions on the outer circumference, collisions between adjacent holding rings can be avoided.

In typical embodiments, on the bearing side of the bearing segment, a first stop is formed between the first recess and the first side edge or a second stop is formed between the second recess and the second side edge. Additional recesses can be provided. In typical embodiments, the length of the one bead between two recesses is at maximum the tooth width or the tooth diameter. In embodiments having two teeth arranged parallel on a bearing segment, at least one recess or at least one stop between the regions in which the teeth rest on the respective bead is optionally also provided. Typically, at least two recesses with at least one stop between the recesses are provided, in particular in a region between the teeth. Stops of embodiments can be formed in particular by further bead sections, for example between two teeth or in a region between a bead supporting a tooth and the respective side edge.

The holding ring can be supported, in particular via its outer circumference, on the stops of the bearing segment.

In embodiments having two rows of teeth on a bearing segment, a holding ring for two teeth can be provided with two recesses for the engagement of the teeth. The holding ring engages around a bead of the bearing segment such that the latter can be supported in an axial direction on the tooth segments via the holding ring. Play can be provided between teeth and holding ring in order to compensate for tolerances, for example, in the spacing of the tooth rows.

In typical embodiments, the holding ring, by engagement in the at least one recess, or by engagement with the flanks of the bead, secures the respective bearing segment in its position transversely with respect to the revolving direction. Typical embodiments comprise two recesses per tooth. In exemplary embodiments, the axial length of the bead of the bearing segment corresponds at maximum to an inside diameter of the holding ring. Typically, the holding ring engages around the bead or around a section of the bead between two beads. Typically, in embodiments, the recesses reach between the teeth and the respective side edges from that region of the bead which supports the tooth as far as the respective side edges, for example the first recess reaches as far as the first side edge and the second recess as far as the second side edge.

In embodiments, precisely one tooth can be mounted on a bearing segment or precisely two teeth can be mounted on a bearing segment. In latter embodiments, the teeth are typically arranged next to one another and the bead has at least one, typically precisely two interruptions.

BRIEF DESCRIPTION OF THE DRAWINGS

The invention will be discussed in more detail below on the basis of the appended drawings, wherein, in the figures.

DETAILED DESCRIPTION

Typical embodiments of the invention will be described below on the basis of the figures, wherein the invention is not restricted to the exemplary embodiments; the scope of the invention is rather defined by the claims. In the description of the embodiment, in some cases, the same reference designations are used for identical or similar parts in different figures and for different embodiments in order to make the description clearer. This however does not mean that corresponding parts of the invention are restricted to the variants illustrated in the embodiments.

Figure 1:
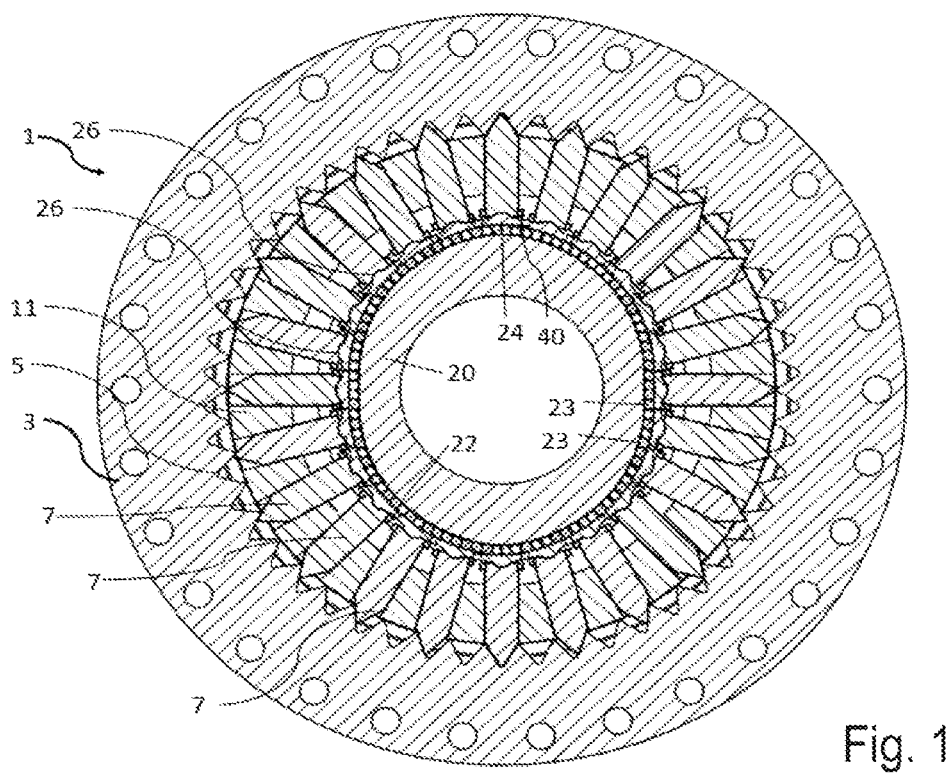
FIG. 1 shows a first embodiment of a gear mechanism in a schematic sectional view.

FIG. 1 shows an exemplary embodiment in a schematic sectional view. FIG. 1 schematically shows, in a section, a gear mechanism 1 which has an internal gear 3 with an internally situated encircling toothing 5. Teeth 7 engage in the toothing 5. For better clarity, not every tooth 7 in FIG. 1 is also provided with the reference designation 7. Typically, two axially parallel rings of teeth having individual teeth 7 are provided. The teeth 7 are mounted in radially displaceable fashion in a tooth carrier 11. For this purpose, the tooth carrier 11 has radially oriented, duct-like circular or slot-like openings which ensure radial guidance of the teeth 7 in the tooth carrier 11. Owing to the radial guidance in the openings, the teeth 7 are capable of moving only in a radial direction along their longitudinal axis; in particular, a rotation relative to the tooth carrier 11 about a longitudinal axis of the gear mechanism 1 is prevented.

The longitudinal axis of the teeth typically refers to the axis running from the tooth root to the tooth tip, whereas the longitudinal axis of the gear mechanism points in the direction of the axis of rotation of the gear mechanism. This may for example be the axis of rotation of the tooth carrier that can be used as drive output, or else the axis of rotation of a cam disk.

The teeth 7 are driven by a cam disk 20 which is designed as a hollow cam disk 20. The cam disk 20 has a profiling 22 for driving the teeth 7 in the radial direction. A course of the profiling 22 has two elevations over the circumference, such that there are opposite teeth 7 which, in the illustration, entered farthest into tooth gaps of the toothing 5.

In the case of the gear mechanism 1 which is illustrated in FIG. 1, the teeth 7 are arranged, with a rolling bearing arrangement, on the profiling of the drive input element. The rolling bearing arrangement comprises rolling bodies 23 which, in this exemplary embodiment, are in the form of needle rollers.

In the exemplary embodiment of FIG. 1, the cam disk is arranged at the inside, and the toothing is arranged at the outside. In such a configuration, the drive output action, for example, is picked off at the internal gear with the toothing or at the tooth carrier, wherein the respective other element is fixed. In further embodiments, the drive input element is arranged at the outside, that is to say outside the tooth carrier, and the toothing is arranged at the inside. It is in turn possible for the drive output action to be picked off at the inner toothing or at the tooth carrier. In typical embodiments, the function of drive input and drive output may be interchanged. The tooth carrier may also be referred to, with its openings, as tooth cage, in which teeth are received so as to be guided in radially linearly displaceable fashion.

The gear mechanism 1 comprises a segmented bearing arrangement for the teeth 7. The segmented bearing arrangement comprises bearing segments 24 which each form, on the bearing side facing toward the tooth 7, a bead 26 which is at least substantially in the shape of a cylinder section and on which the root of two teeth 7 (see FIG. 3) or, in typical embodiments, one, three or four teeth adjacent to one another in an axial direction of the gear mechanism 1, may be arranged. The bead 26, together with a corresponding recess in the tooth root of the respective tooth 7, prevents slippage of the tooth 7 on the bearing segment 24 in the circumferential direction.

The beads 26 serve in each case to form root joints for the teeth 7, such that the teeth 7 can tilt relative to the bearing segments 24 in order to ensure unconstrained guidance. The bearing segments 24 are displaceable relative to one another in a revolving direction, such that the spacings between the bearing segments 24 can be varied. In this way, a degree of freedom in the revolving direction of the bearing segments 24 is not blocked either. This permits substantially unconstrained guidance and substantially unconstrained radial drive of the bearing segments 24 by the profiling 22 of the cam disk 20. To minimize the friction resistance between the profiling 22 and the bearing segments 24, the rolling bodies 23 are provided as needle rollers. In further embodiments, balls or other rolling bearings are provided for the mounting of bearing segments. In other embodiments, a plain bearing arrangement can be provided between the profiling 22 and the bearing segments 24.

Figure 2:
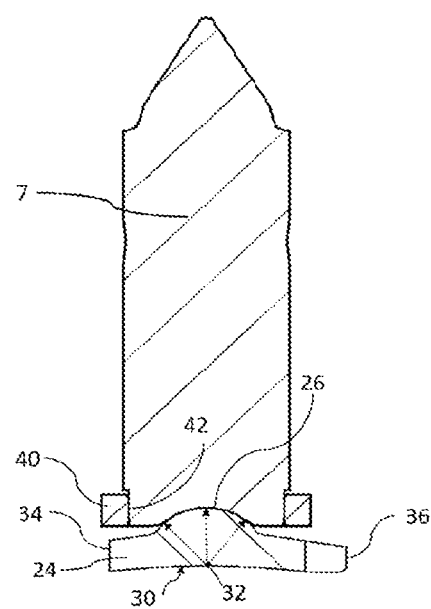
FIG. 2 shows a bearing segment and a tooth of the embodiment of FIG. 1 in a schematic sectional view.
Figure 3:
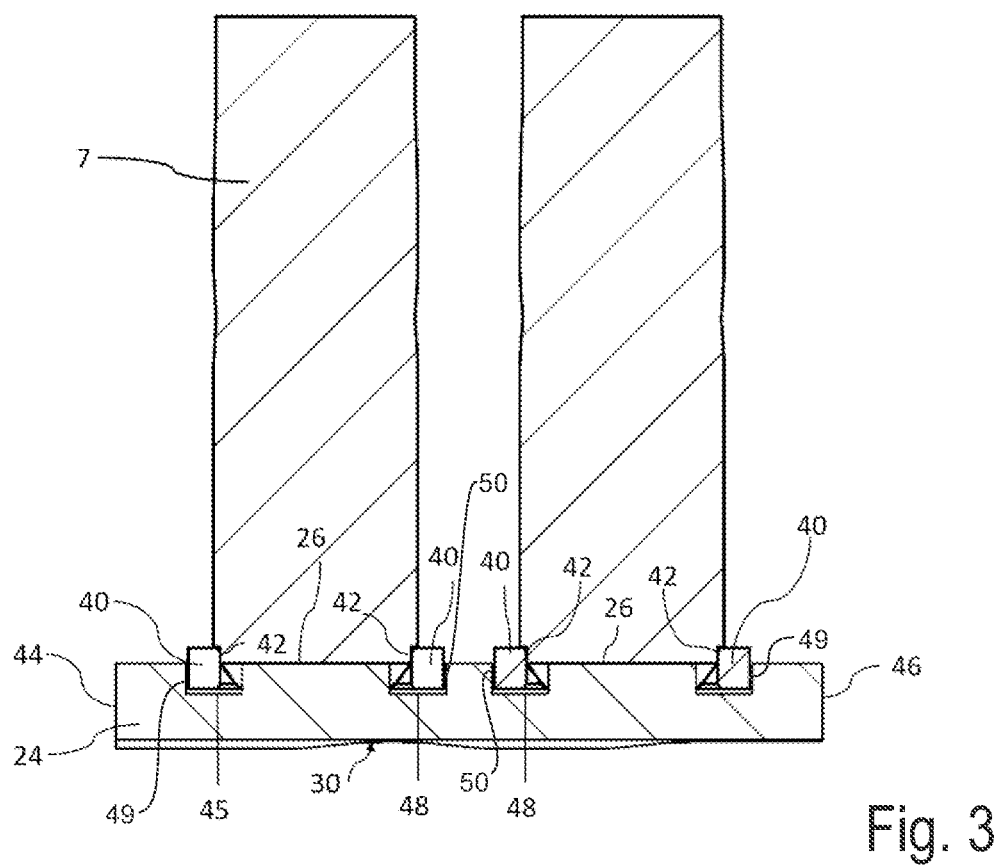
FIG. 3 shows the bearing segment of FIG. 2 of the embodiment of FIG. 1 with two teeth in a further sectional view.

FIGS. 1, 2 and 3 will be described together, wherein not all of the details will be discussed again, and reference designations are used identically for the same parts.

FIG. 2 illustrates a bearing segment 24 of the gear mechanism 1 of FIG. 1. The bearing segment 24 comprises a bead 26 on that side of the bearing segment 24 which, in the gear mechanism 1, faces toward a tooth 7. The round surface section of the bead 26 is in this case of circular form. The central point of the circle coincides with a running side 30 of the bearing segment 24. In this way, for the teeth 7 which are mounted on the bearing segments 24, a respective axis of rotation 32 is realized which coincides with the running side 30. In this way, the teeth 7 are in each case mounted in an articulated manner on a bearing segment.

The running side 30 is that side of the bearing segment 24 which faces away from the tooth, i.e. the side which faces toward the rolling body 23 or else toward the cam disk 20. The running side 30 corresponds to the surface on which the rolling bodies 23 roll.

The bearing segment 24 comprises a front edge 34 and a rear edge 36. Here, the expressions "front" and "rear" are not meant in the sense of a movement; rather, they refer to two opposite sides of the bearing segment 24 in the revolving direction. Typical gear mechanisms can be operated in two directions, such that, during operation, it is also possible for the front segment edge to be situated at the rear in the direction of movement during revolving, and accordingly for the rear segment edge to be situated at the front.

An encircling shoulder 42 which is encompassed by a holding ring 40 is provided around a root or at a tooth base of the tooth 7. The holding rings will be described in more detail in conjunction with FIG. 3.

FIG. 3 shows a further sectional view of the bearing segment 24 with the teeth 7 of the embodiment of FIG. 2, wherein additionally also details of the gear mechanism 1 are shown. FIG. 3 is described in conjunction with FIGS. 1 and 2 since the same parts are in each case illustrated although details are also shown in FIG. 3 that are not shown in FIG. 1 and in FIG. 2.

The holding rings 40 prevent a displacement of the teeth 7 in an axial direction of the gear mechanism, i.e. in a direction along the bead 26. The bead 26 runs from a first side edge 44 to a second side edge 46 of the bearing segment 24 in a direction transversely with respect to a running direction of the bearing segment 24 and at least substantially centrally between the front edge and rear edge of the bearing segment.

The bead 26 is arranged in a central region between the first side edge 44 and the second side edge 46. The bead has a first recess 45 on a first side of the central region and the bead 26 has a second recess 47 on a second side of the central region. In addition, the bead 26 also has two further recesses 48 which are arranged approximately centrally between the first recess 45 and the second recess 47. The further recesses 48 can therefore also be referred to as interruptions of the bead.

All of the recesses 45, 47 and 48 are each located somewhat below a circumference of a shoulder 42 of the teeth 7. In this way, abutments for the holding rings 40 are created in the axial direction by flanks on the recesses 45, 47 and 48 of the bead 26.

With embodiments, the bearing segments can be held in an axial direction by the teeth guided in the tooth carrier. Lateral thrust rings or similar for the bearing segments may thus be unnecessary in some circumstances.

The flanks which are arranged towards the recesses 45, 47 and 48 run in circular fashion at least in sections such that they are adapted to the outer circumference of the circular holding ring 40. They may also be considered to be stops 49, 50 (FIGS. 3-5), in particular for the holding ring. Typically, one holding ring is provided per tooth 7, said holding ring at least partially surrounding the tooth base of the respective tooth 7 at the circular shoulder 42.

Figure 4:
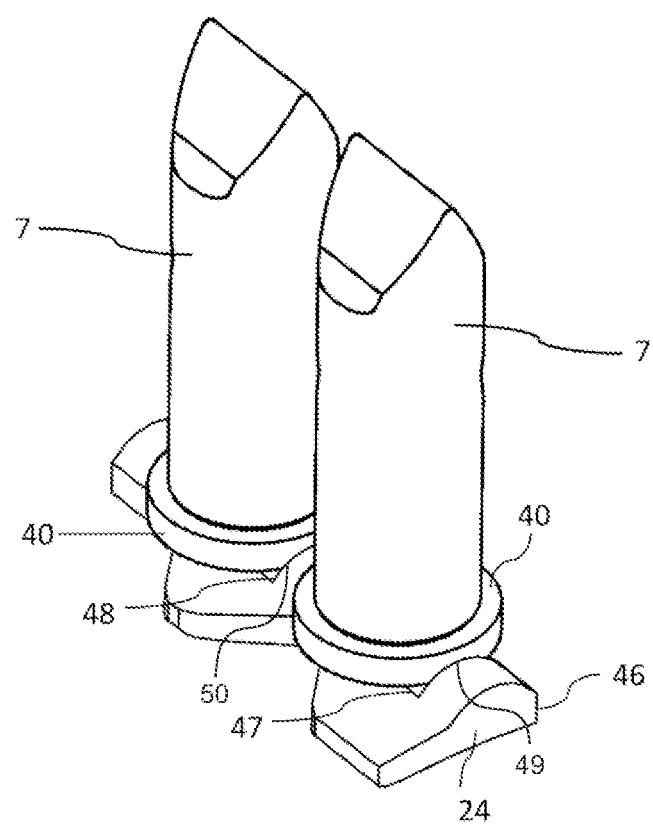
FIG. 4 shows the bearing segment of FIG. 2 and of FIG. 3 in a schematic perspective view.
Figure 5:
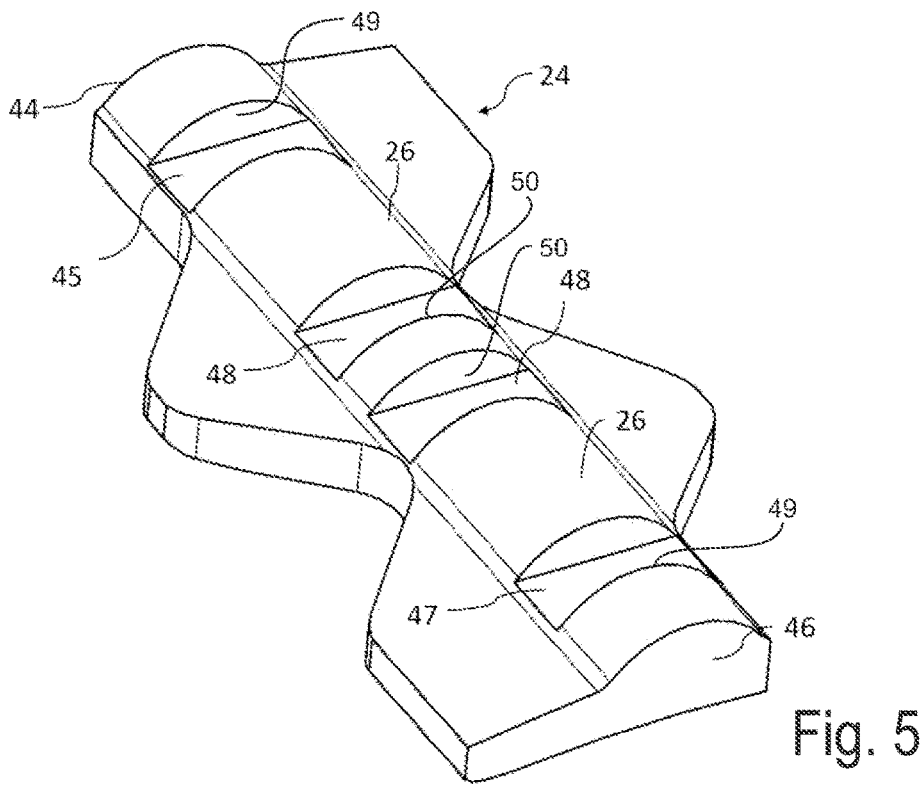
FIG. 5 shows the bearing segment of FIG. 2 and of FIG. 3 in a further schematic perspective view.

FIG. 4 and FIG. 5 show the bearing segment of FIG. 2 and of FIG. 3 in schematic perspective views.

Figure 6:
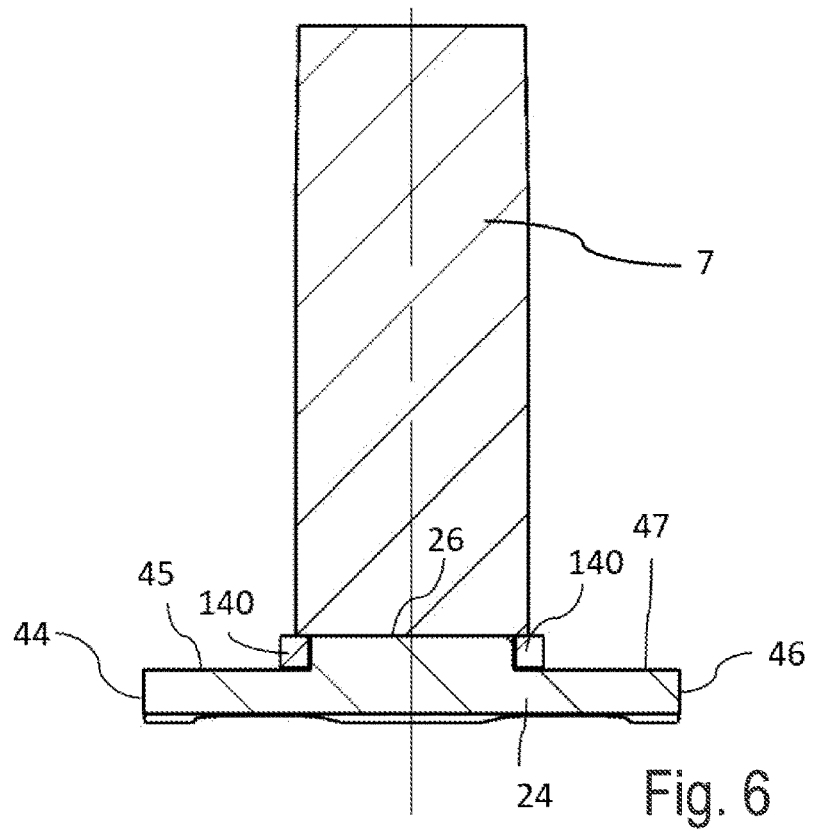
FIG. 6 schematically shows a further embodiment of a bearing segment with a tooth and holding ring in a schematic sectional view.

FIG. 6 shows a further embodiment of a bearing segment 24 with precisely one tooth 7 which is mounted on the bearing segment 24 and which is held by an alternative embodiment of a holding ring 140.

Figure 7:
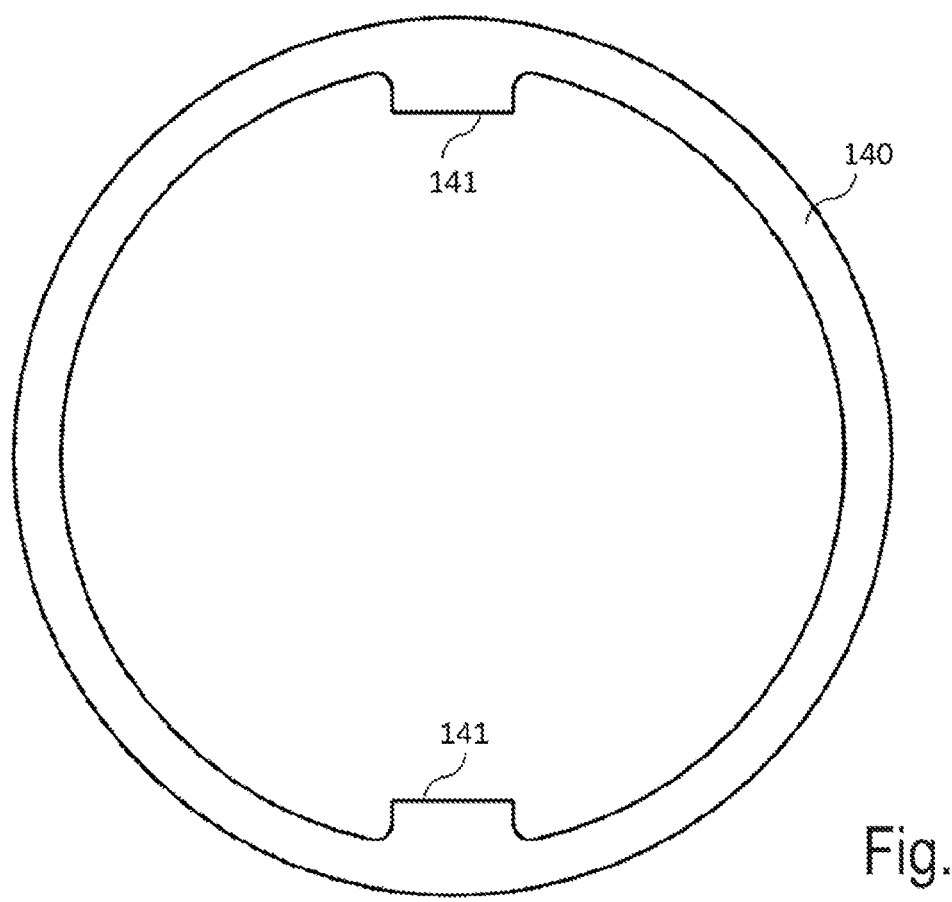
FIG. 7 shows the holding ring of the embodiment of FIG. 6 in a top view.

The holding ring 140 is once again shown in a top view in FIG. 7. The holding ring 140 has inwardly directly lugs 141 which support the bead 26 or the lateral flanks thereof. The section in the sectional view of FIG. 6 runs through the lugs 141.

The holding ring 140 grips around a tooth base of the tooth 7 in other regions than in the region shown in the section in FIG. 6. It should be taken into consideration that the tooth 7 has, in the region of the tooth base, a recess for engagement with the bead 26.

In the embodiment of FIG. 6 and FIG. 7, the recesses 45 and 47 can reach as far as the side edges 44, 46 of the bearing segment 24. In further embodiments, additional stops can be arranged in the region between bead 26 and side edges 44, 46. The gear mechanism 1 of FIG. 1 can also be operated with the bearing segment 24 of FIGS. 6 and 7.

The invention is not restricted to embodiments described above; rather, the scope of the invention is defined by the appended claims.

The invention claimed is:

1. Gear mechanism (1), having
a toothing (5),
a tooth carrier (11) in which a plurality of teeth (7) for engagement with the toothing are accommodated, wherein the teeth (7) are radially displaceably mounted relative to the tooth carrier (11),
a drive input element with a profiling (22) for radially driving the radially displaceably mounted teeth (7), and
bearing segments (24) for mounting the teeth on the profiling, wherein each of the bearing segments comprises:
a running side oriented in the direction of the profiling and a bearing side opposite the running side,
a tooth bearing, which is arranged on the bearing side, for articulated mounting of at least one of the teeth, wherein the tooth bearing comprises a bead which is at least substantially in the shape of a cylinder section and which is arranged from a first side edge to a second side edge of the bearing segment in a direction transversely with respect to a running direction of the bearing segment, and wherein the bead is arranged in a central region between the first side edge and the second side edge and has a first recess on a first side of the central region and/or has a second recess on a second side of the central region, wherein one holding ring (40) is provided per tooth, said holding ring at least partially surrounding a tooth base of the respective tooth (7), and wherein the holding ring, by engagement in the at least one recess, secures the respective bearing segment in its position transversely with respect to the revolving direction.

2. Gear mechanism according to claim 1, wherein the gear mechanism is an axial gear mechanism or a linear gear mechanism.

3. Gear mechanism according to claim 1, wherein, towards the recesses, the bead in each case has lateral flanks which run rectilinearly at least in sections in a circumferential direction and/or run circularly at least in sections.

4. Gear mechanism according to claim 1, wherein a shoulder (42) for receiving the holding ring (40) is provided on the tooth base on an outer circumference of the tooth (7).

5. Gear mechanism according to claim 1, wherein the teeth have a circular cross section.

6. Gear mechanism according to claim 1, wherein the holding ring is annular.

7. Gear mechanism (1), having
a toothing (5),
a tooth carrier (11) in which a plurality of teeth (7) for engagement with the toothing are accommodated, wherein the teeth (7) are radially displaceably mounted relative to the tooth carrier (11),
a drive input element with a profiling (22) for radially driving the radially displaceably mounted teeth (7), and
bearing segments (24) for mounting the teeth on the profiling, wherein each of the bearing segments comprises:

a running side oriented in the direction of the profiling and a bearing side opposite the running side,
a tooth bearing, which is arranged on the bearing side, for articulated mounting of at least one of the teeth,
wherein the tooth bearing comprises a bead which is at least substantially in the shape of a cylinder section and which is arranged from a first side edge to a second side edge of the bearing segment in a direction transversely with respect to a running direction of the bearing segment, and
wherein the bead is arranged in a central region between the first side edge and the second side edge and has a first recess on a first side of the central region and/or has a second recess on a second side of the central region, wherein one holding ring (40) is provided per tooth, said holding ring at least partially surrounding a tooth base of the respective tooth (7), and wherein an outer circumference of the holding ring is rectilinear in sections.

8. Gear mechanism according to claim 1, wherein, on the bearing side of the bearing segment, a first stop is formed between the first recess and the first side edge and/or a second stop is formed between the second recess and the second side edge.

9. Gear mechanism according to claim 1, wherein the holding ring secures the bearing segment in its position transversely with respect to the revolving direction via the bead and/or by stops formed between the first recess and the first side edge and/or between the second recess and the second side edge.

10. Gear mechanism according to claim 1, wherein the first recess extends to the first side edge and the second recess extends to the second side edge.

11. Gear mechanism according to claim 1, wherein precisely one tooth is mounted on a bearing segment or precisely two teeth are mounted on a bearing segment.

12. Use of a gear mechanism according to claim 1.

13. Gear mechanism according to claim 1, wherein the first recess and/or the second recess is defined along the bead in the direction transversely with respect to the running direction of the bearing segment.

* * * * *